(12) United States Patent
Chen et al.

(10) Patent No.: US 11,507,413 B2
(45) Date of Patent: Nov. 22, 2022

(54) TRACKING METHOD, APPARATUS, DEVICE, AND MACHINE-READABLE MEDIUM

(71) Applicant: Alibaba Group Holding Limited, Grand Cayman (KY)

(72) Inventors: Lingjun Chen, Hangzhou (CN); Bin Wang, Hangzhou (CN); Liangliang Zhu, Hangzhou (CN); Xu Zeng, Hangzhou (CN); Zilong Liu, Hangzhou (CN); Junjie Cai, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 0 days.

(21) Appl. No.: 16/726,669

(22) Filed: Dec. 24, 2019

(65) Prior Publication Data

US 2020/0133714 A1 Apr. 30, 2020

Related U.S. Application Data

(63) Continuation of application No. PCT/CN2018/091990, filed on Jun. 20, 2018.

(30) Foreign Application Priority Data

Jun. 27, 2017 (CN) .......................... 201710500931.1

(51) Int. Cl.
*G06F 13/24* (2006.01)
*G06F 9/48* (2006.01)
(Continued)

(52) U.S. Cl.
CPC .......... *G06F 9/4812* (2013.01); *G06F 9/4418* (2013.01); *G06F 9/544* (2013.01); *G06F 13/24* (2013.01)

(58) Field of Classification Search
CPC ...... G06F 13/00; G06F 9/4812; G06F 9/4418; G06F 9/544; G06F 13/24
See application file for complete search history.

(56) References Cited

U.S. PATENT DOCUMENTS 5,485,574 A 1/1996 Bolosky et al.
6,077,312 A 6/2000 Bates et al.
(Continued)

FOREIGN PATENT DOCUMENTS

CN 1266227 A 9/2000
CN 1485860 A 3/2004
(Continued)

OTHER PUBLICATIONS

CN International Search Report dated Sep. 25, 2018, for CN PCT Application No. PCT/CN2018/091990, 2 pages.
(Continued)

*Primary Examiner* — Henry Tsai
*Assistant Examiner* — Kim T Huynh
(74) *Attorney, Agent, or Firm* — Lee & Hayes, P.C.

(57) ABSTRACT

A tracking method, an apparatus, a device, and a machine-readable medium are provided. The method specifically includes: writing a tracking result of an activity of an operating system and/or a running activity of a program into a buffer when an interrupt is disabled; and reading and sending the tracking result from the buffer when the interrupt is enabled. The embodiments of the present disclosure can effectively shorten the maximum time during which interrupts are disabled for an operating system, and thereby can effectively improve the performance of the operating system and/or a program.

20 Claims, 6 Drawing Sheets

(51) Int. Cl.
*G06F 9/4401* (2018.01)
*G06F 9/54* (2006.01)

(56) References Cited

U.S. PATENT DOCUMENTS

| | | | |
|---|---|---|---|
| 6,385,742 | B1 | 5/2002 | Kirsch et al. |
| 6,519,718 | B1 | 2/2003 | Graham et al. |
| 7,536,605 | B2 | 5/2009 | Keaffaber et al. |
| 8,135,894 | B1 | 3/2012 | Ball |
| 8,136,096 | B1 * | 3/2012 | Lindahl ............... G06F 11/3636 717/129 |
| 8,453,143 | B2 | 5/2013 | Mahalingam et al. |
| 8,752,027 | B2 | 6/2014 | Noureddine et al. |
| 9,075,639 | B1 | 7/2015 | Ni |
| 9,317,318 | B2 | 4/2016 | Zheng et al. |
| 2002/0065948 | A1 * | 5/2002 | Morris ................ G06F 11/3466 719/318 |
| 2003/0167366 | A1 * | 9/2003 | Radhakrishna ......... G06F 13/24 710/262 |
| 2018/0113764 | A1 * | 4/2018 | Bhandari ............ G06F 11/1441 |

FOREIGN PATENT DOCUMENTS

| | | |
|---|---|---|
| CN | 1577261 A | 2/2005 |
| CN | 103064815 A | 4/2013 |
| CN | 104077224 A | 10/2014 |
| CN | 104570826 A | 4/2015 |
| CN | 105468510 A | 4/2016 |
| WO | WO2012016438 | 2/2012 |

OTHER PUBLICATIONS

Chines Office Action dated Aug. 25, 2021 for Chinese patent application No. 201710500931, a counterpart foreign application of U.S. Appl. No. 16/726,669, 14 pages.

Chinese Search Report dated Aug. 17, 2021 for Chinese patent application No. 2017105009311, a counterpart foreign application of U.S. Appl. No. 16/725,669, 1 page.

Chinese PCT Written Opinion dated Sep. 25, 2018, for CN PCT Application No. PCT/CN2018/091990, 4 pages.

Chinese Office Action dated Jun. 28, 2022 for Chinese patent application No. 201710500931, a counterpart foreign application of U.S. Appl. No. 16/726,669, 7 pages.

* cited by examiner

FIG. 6

TRACKING METHOD, APPARATUS, DEVICE, AND MACHINE-READABLE MEDIUM

CROSS REFERENCE TO RELATED PATENT APPLICATIONS

This application claims priority to and is a continuation of PCT Patent Application No. PCT/CN2018/091990 filed on 20 Jun. 2018, and is related to and claims priority to Chinese Application No. 201710500931.1, filed on 27 Jun. 2017 and entitled "Tracking Method, Apparatus, Device, and Machine-Readable Medium," which are hereby incorporated by reference in their entirety.

TECHNICAL FIELD

The present disclosure relates to the technical field of computer technologies, and particularly to tracking methods, tracking apparatuses, devices, and machine-readable media.

BACKGROUND

A computer system includes a general-purpose computer system (PC) and an embedded computer system (abbreviated as an Embedded System). A Real Time Operating System (RTOS) is a basic operating platform of an embedded system, and is the basis of stability and reliable work of the embedded system, with functions and performance thereof directly affecting functions and performance of the embedded system. A feature of the RTOS is timeliness, which reflects the ability of the real-time operating system to respond to external events quickly. An indicator of the RTOS is the longest time during which interrupts are disabled.

Debugging is an important part for RTOS during the early development process and in the post-maintenance process. At present, debugging of a RTOS can be realized by tracking activities of the operating system. An existing tracking scheme can send a tracking result of activities of an operating system through a serial communication mode when an interrupt is disabled, so that a communication peer can learn the tracking result of the activities of the operating system of the real-time operating system.

However, in practical applications, since the speed of a serial communication is low, a relatively long time is taken for sending a tracking result through a serial communication mode. Therefore, the existing tracking scheme increases the longest time during which interrupts are disabled for the RTOS, thereby affecting the performance of the RTOS. An increase in the longest time during which interrupts are disabled may cause an interrupt of a hardware device to be lost, and thereby lead to a data loss of the hardware device, Alternatively, An increase in the longest time during which interrupts are disabled may cause an interrupt of a hardware device to be lost may cause a response time of a task or a program to be slow, and result in the task or the program failing to complete an activity within a specified time. In some cases, an increase in the longest time during which interrupts are disabled can even cause errors in the RTOS.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

The technical problems to be solved by embodiments of the present disclosure are to provide a tracking method that can effectively shorten the longest time during which interrupts are disabled for an operating system, thereby effectively improving the performance of the operating system and/or a program.

Correspondingly, the embodiments of the present disclosure further provide a tracking apparatus, a device, and one or more storage media, to ensure implementations and applications of the foregoing method.

In order to solve the above problems, the embodiments of the present disclosure disclose a tracking method, which includes: writing a tracking result of an activity of an operating system and/or a running activity of a program into a buffer when an interrupt is disabled; and reading and sending the tracking result from the buffer when the interrupt is enabled.

In implementations, reading and sending the tracking result from the buffer when the interrupt is enabled includes reading and sending the tracking result from the buffer according to a preset period when the interrupt is enabled.

In implementations, reading and sending the tracking result from the buffer according to the preset period when the interrupt is enabled includes reading and sending the tracking result from the buffer when the interrupt is enabled; and entering a sleep state according to the preset period after sending the read tracking result.

In implementations, prior to reading and sending the tracking result from the buffer when the interrupt is enabled, the method further includes enabling the interrupt after the tracking result of the operating system activity and/or the program running activity is written into the buffer.

In implementations, prior to writing the tracking result of the activity of the operating system and/or the running activity of the program into the buffer when the interrupt is disabled, the method further includes disabling the interrupt in response to detecting that an API of the operating system and/or the program is called, and corresponding calling information satisfies a preset condition.

In implementations, prior to writing the tracking result of the activity of the operating system and/or the running activity of the program into the buffer when the interrupt is disabled, the method further includes in response to detecting that an API of the operating system and/or the program is called, tracking a corresponding activity of the operating system and/or a corresponding running activity of the program of the called API to obtain the tracking result of the activity of the operating system and/or the running activity of the program.

The embodiments of the present disclosure further disclose a tracking apparatus, which includes a write buffer module configured to write a tracking result of an activity of an operating system and/or a running activity of a program into a buffer when an interrupt is disabled; a read buffer module configured to read the tracking result from the buffer when the interrupt is enabled; and a sending module configured to send the read tracking result when the interrupt is enabled.

In implementations, the read buffer module reads the tracking result from the buffer according to a preset period when the interrupt is enabled, and the sending module sends the read tracking result according to the preset period when the interrupt is enabled.

In implementations, the read buffer module and the sending module enter a sleep state according to a preset period after the sending module sends the read tracking result.

In implementations, the apparatus further includes an interrupt enabling module configured to enable the interrupt after the tracking result of the activity of the operating system and/or the running activity of program is written into the buffer, before the read buffer module reads the tracking result from the buffer when the interrupt is enabled.

In implementations, the apparatus further includes an interrupt disabling module configured to disable the interrupt in response to detecting that an API of the operating system is called and corresponding call information satisfies a preset condition, before the write buffer module writes the tracking result of the activity of the operating system and/or the running activity of the program into the buffer when the interrupted is disabled.

In implementations, the apparatus further includes a tracking module configured to: in response to detecting that an API of the operating system and/or the program is called, track a corresponding activity of the operating system behavior and/or a corresponding running activity of the program of the called API to obtain the tracking result of the activity of the operating system and/or the running activity of the program, before the write buffer module writes the tracking result of the activity of the operating system and/or the running activity of the program into the buffer when the interrupted is disabled.

The embodiments of the present disclosure further disclose a device, which includes one or more processors, and one or more machine-readable media storing instructions that, when executed by the one or more processors, cause the device to perform one or more of the tracking methods as described in the embodiments of the present disclosure.

The embodiments of the present disclosure also disclose one or more machine-readable media storing instructions that, when executed by one or more processors, cause a device to perform one or more of the tracking methods as described in the embodiments of the present disclosure.

Compared with existing technologies, the embodiments of the present disclosure include the following advantages:

In the embodiments of the present disclosure, a processor may be used to write a tracking result of an activity of an operating system and/or a running activity of a program into a buffer when an interrupt is disabled. The rate at which the processor writes the tracking result of the activity of the operating system and/or the running activity of the program into the buffer is usually significantly higher than the rate at which the tracking result of the operating system is sent by means of a serial communication, etc. Therefore, the embodiments of the present disclosure can quickly write the tracking result of the activity of the operating system and/or the running activity of the program into the buffer. In this way, the maximum time during which the interrupt is disabled for the operating system can be effectively shortened, which can effectively improve the performance of the operating system and/or the program.

DETAILED DESCRIPTION

In order to enable the purposes, features and advantages of the present disclosure to become more apparent and easily understood, the present disclosure is described in further detail in conjunction with the accompanying drawings and specific implementations.

The concepts of the present disclosure are susceptible to various modifications and replacements, and specific embodiments thereof are illustrated using the accompanying drawings and will be described in detail herein. It should be understood, however, that the above content is not intended to limit the concepts of the present disclosure to the specific embodiments that are disclosed. Rather, the specification and the appended claims of the present disclosure are intended to cover all modifications, equivalents and replacements.

In the present specification, "one embodiment", "an embodiment", "a specific embodiment", and the like, represent that embodiments so described may include specific features, structures or characteristics. However, each embodiment may or may not necessarily include such specific features, structures or characteristics. Moreover, such phrases do not necessarily refer to the same embodiment. In addition, when a specific feature, structure, or characteristic is described (whether explicitly or not) in connection with an embodiment, such feature, structure, or characteristic may be considered to be related to other embodiments within the scope of knowledge of one skilled in the art. Furthermore, it should be understood that items in a list included in a form "at least one of A, B, and C" may include the following possible items: (A), (B), (C), (A and B), (A and C), (B and C), or (A, B and C). Similarly, items listed in a form "at least one of A, B or C" may mean (A), (B), (C), (A and B), (A and C), (B and C) or (A, B and C).

In some cases, the disclosed embodiments can be implemented in hardware, firmware, software, or any combination thereof. The disclosed embodiments can also be implemented as instructions included or stored in one or more non-transitory machine-readable (e.g., computer readable) storage media. The instructions can be executed by one or more processors. A machine-readable storage medium may be implemented as a storage device, mechanism, or other physical structure (e.g., a volatile or nonvolatile memory, a media disk, or other media and physical structure devices) configured to store information in a form that can be read by a machine.

In accompanying drawings, some structural or method features may be shown in particular arrangements and/or orders. However, such specific arrangements and/or orders are not necessary in implementations. Rather, in implementations, such features may be arranged in different ways and/or sequences, rather than the ones as shown in the drawings. In addition, what is included in a structural or method feature in a particular drawing is not meant to imply that such feature is required by all embodiments. In implementations, these features may not be included, or these features may be combined with other features.

The embodiments of the present disclosure provide a tracking solution. The tracking solution can write a tracking result of an activity of an operating system and/or a running activity of a program into a buffer when an interrupt is disabled, and read and send the tracking result from the buffer when the interrupt is enabled. Since the embodiments of the present disclosure can write the tracking result of the activity of the operating system and/or the running activity of the program into the buffer using a processor when the interrupt is disabled, the rate at which the processor writes the tracking result of the activity of the operating system and/or the running activity of the program into the buffer is usually significantly higher than the rate at which the tracking result of the activity of the operating system and/or the running activity of the program is sent by means of a serial communication, etc., the embodiments of the present disclosure can quickly write the tracking result of the activity of the operating system and/or the running activity of the program when the interrupt is disabled. As such, the maximum time during which the interrupt is disabled for the operating system can be effectively shortened, thereby effectively improving the performance of the operating system and/or the program. For example, the embodiments of the present disclosure can avoid an occurrence of an error of an operating system that is caused by an activity of the system under the influence of an increase in the maximum time during which interrupts are disabled to some extent. For another example, the embodiments of the present disclosure can greatly reduce an interrupt loss rate and a data loss rate of a hardware device. For another example, the embodiments of the present disclosure can improve a response time of a task or a program to a certain extent, so that the task or the program can complete an activity that is to be performed within a preset time.

In the embodiments of the present disclosure, an interrupt is an internal mechanism for a computer system to process an internal or external event in real time. An interrupt refers to a situation that a CPU temporarily stops an execution of a current program and switches to execute a program and an execution process that handle a new situation when a need arises. Specifically, when a certain internal or external event occurs, a processor is caused to suspend a program that is currently executed and switch to perform processing of an interrupt event.

Enabling interrupts means that an operating system can interrupt a continuous running process and switch to perform processing of an interrupt event. Specifically, enabling an interrupt is able to cause a processor to respond to an asynchronous interrupt generated by hardware, but fails to protect the security of data corresponding to a critical section of code. In other words, an asynchronous interrupt can easily lead to a destruction or loss of data in a critical section of code. Disabling interrupts refers to shutting down system interrupts and not allowing a system to interrupt a continuous running process. Specifically, disabling interrupts can make a processor unable to respond to an asynchronous interrupt generated by hardware, and thereby protect the security of data corresponding to a critical section of code. As such, this can avoid an asynchronous interrupt from causing a destruction or loss of data in a critical section of code to some extent, but will cause the maximum time during which interrupts are disabled to be increased, thereby reducing the real-time performance of the operating system. For example, an increase in the maximum time during which interrupts are disabled can cause a loss of interrupt of a hardware device, thereby resulting in a data loss of the hardware device. For another example, an increase in the maximum time during which interrupts are disabled can also lead a slow response time of a task or a program, causing the task or program to fail to complete a required activity within a specified time. For another example, in some cases, an increase in the maximum time during which interrupts are disabled can also cause an occurrence of errors in an operating system.

The embodiments of the present disclosure can be applied to a tracking scenario of an operating system and/or a program. Examples of a tracking scenario of an operating system may include a tracking scenario of an embedded system. It can be understood that specific application scenarios are not limited by the embodiments of the present disclosure.

In implementations, an operating system of the embodiments of the present disclosure may include a general operating system, or a real-time operating system. The general operating system pays attention to an average response time of each execution without concern for a response time of a specific execution. In addition to satisfying functional requirements of applications, a real-time operating system also needs to satisfy timeliness requirements of the applications. It can be understood that the embodiments of the present disclosure do not limit any specific operating systems.

Figure 1:
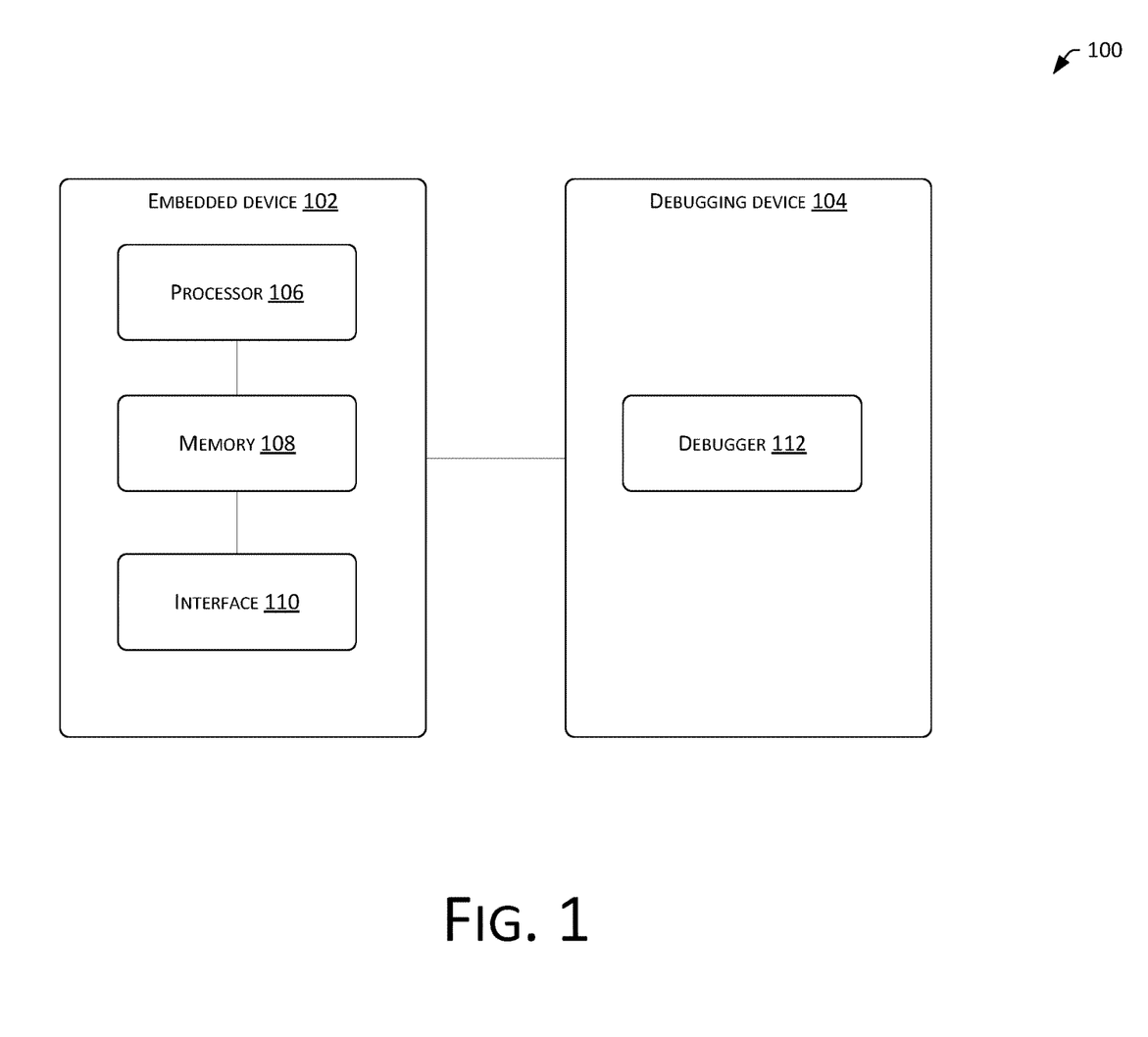
FIG. 1 is a schematic diagram of an application environment of a tracking method according to the embodiments of the present disclosure.

Referring to FIG. 1, a schematic diagram of an application environment 100 of a tracking method according to the embodiments of the present disclosure is shown. As shown in FIG. 1, the application environment 100 may include an embedded device 102 and a debugging device 104, wherein the embedded device 102 and the debugging device 104 can conduct communications through a serial communication and/or a network.

The embedded device 102 may include a processor 106, a memory 108, an interface 110, etc. The processor may include a CPU, or a microcontroller (MCU, Micro Controller Unit), etc. The memory 108 may be a machine-readable storage medium. The memory 108 may include a read only memory, a random access memory, etc. The interface 110 may include a serial port, a network interface, and the like.

A debugger 112 can run in the debugging device 104. The debugger 112 is an integrated development environment running on the debugging device 104, and can integrate editing, assembling, compiling, linking, and debugging environments into one body. The debugger 112 supports low-level assembly language and C language, and can perform debugging based on a tracking result. Furthermore, the debugger 112 can provide debugging information and/or results to a user based on a friendly graphical user interface.

In practical applications, a process of debugging by the debugger 112 according to a tracking result may include: parsing the tracking result to obtain time information, running information of a task, and API(s) executed by the task that are included in the tracking result, so that debugging information can be obtained and displayed on an interface based on the tracking result may be obtained the time information, the running information of the task, and the API(s) executed by the task that are included in the tracking result. In implementations, the debugging information may be displayed in a graphical form.

In implementations, the debugging information may include a timeline panel that can describe respective start times and end times of task(s) and API(s). Each row of the timeline panel can display a running status of each task, and the time on the time axis can be increased in an order from left to right. An API that a task has executed can also be displayed on the timeline panel.

In implementations, the debugging information may include an analysis panel, which can describe what activit(ies) of an operating system ha(ve) been occurred in an API, and can also reflect time consumption of all activities of the operating system in the API. For example, an amount of time consumed by each activity of an operating system in an API can be displayed as a percentage of the total time consumed by all activities of the operating system.

An operating system can be run on the embedded device 102. In implementations, the embedded device 102 can send a tracking result of an activity of the operating system to the debugging device 104, to cause the debugging device 104 to analyze and display the tracking result that is received. Specifically, the embedded device 102 can write a tracking result of activities of the operating system into a buffer through the processor 121 when interrupts are disabled, read the tracking result from the buffer through the processor 121 when interrupts are enabled, and send the read tracking result to the debugging device via the interface 123.

It can be understood that FIG. 1 is only an example of an application environment of the tracking methods according to the embodiments of the present disclosure, and is not to be understood as a limitation to the application environment of the tracking methods according to the embodiments of the present disclosure. It can be understood that one skilled in the art can determine an application environment of the tracking methods of the embodiments of the present disclosure according to actual application requirements. For example, the tracking methods of the embodiments of the present disclosure can also be applied to a tracking scenario of a program to track a system call of the program, a signal generation, or a call to a library function. The embodiments do not limit any specific application environments of the tracking methods.

The embodiments of the present disclosure provide a tracking method.

Figure 2:
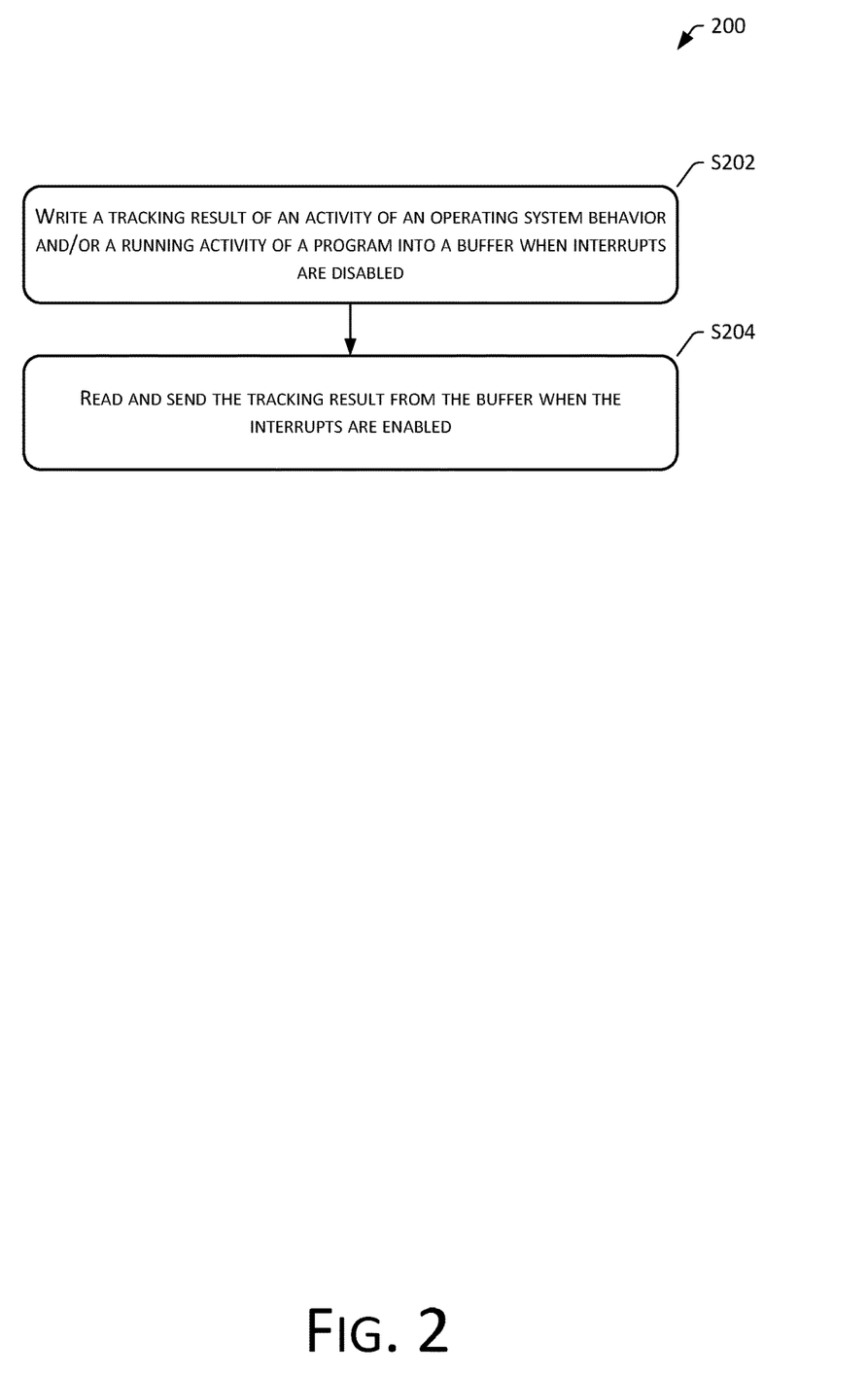
FIG. 2 is a flowchart of an exemplary tracking method of the present disclosure.

Referring to FIG. 2, a flowchart of an exemplary tracking method 200 of the present disclosure is shown, which may specifically include the following operations.

S202: Write a tracking result of an activity of an operating system behavior and/or a running activity of a program into a buffer when interrupts are disabled.

S204: Read and send the tracking result from the buffer when the interrupts are enabled.

The embodiments of the present disclosure can be applied to tracking scenarios of an operating system and/or a program, and can be applied to a device, such as an embedded device, a non-embedded device, etc., in tracking scenarios. It can be understood that the embodiments of the present disclosure do not have any limitations on for specific tracking scenarios of operating systems and/or programs, and specific devices of applications.

In practical applications, a tracking method of an operating system can be used to obtain a tracking result of activities of the operating system. In implementations, a process of obtaining a tracking result of an activity of an operating system using a tracking mode of the operating system may include: in response to detecting that an application programming interface (API) of an operating system is called, tracking an activity of the operating system corresponding to the called API to obtain a tracking result of the activity of the operating system. It can be understood that the embodiments of the present disclosure do not have any limitations on specific manners of acquisition corresponding to a tracking result of activities of an operating system. An API of an operating system may be an API related to a kernel of the operating system, and an execution of the API of the operating system may reflect an activit(ies) of the operating system. Therefore, tracking the activit(ies) of the operating system corresponding to the called API may obtain a tracking result of the activit(ies) of the operating system.

In implementations, the foregoing activity of the operating system may include: an activity associated with a task deletion, an activity associated with a task creation, an activity associated with a change of a task priority, an activity associated with a creation of a semaphore, an activity associated with a creation of a mutex lock, etc. It can be understood that the embodiments of the present disclosure do not have any limitations on specific activities of operating systems.

Similarly, a tracking method of a program can be used to obtain a tracking result of a running activity of the program. In implementations, a process of obtaining a tracking result of a running activity of a program using a tracking mode of the program may include: in response to detecting that an API of a program is called, tracking a running activity of the program corresponding to the called API to obtain a tracking result of the running activity of the program. In implementations, a running activity of a program may include: a system call corresponding to a program process, a signal generation, or an activity associated with calling a library function. It can be understood that the embodiments of the present disclosure do not have any limitations on specific running activities of programs.

In implementations, the tracking method of the embodiments of the present disclosure may be used in a tracking function of an operating system. The tracking function of the operating system may be a sub-function of an API of the operating system, and performs S202. As such, tracking of activit(ies) of the operating system corresponding to a called API can be implemented. Additionally or alternatively, the tracking method of the embodiments of the present disclosure can be used in a tracking function of a program, and the tracking function of the program can be used to track running process(es) of the program, and performs S202, so that tracking of running activit(ies) of the program can be implemented.

Since an API of an operating system is in a critical section of code, i.e., the API of the operating system does not allow any interrupt to be entered once being executed, interrupts are disabled upon detecting that the API of the operating system is called and corresponding calling information meets a preset condition. Similarly, interrupts can be disabled when detecting that an API of a program is called and corresponding calling information meets a preset condition.

The embodiments of the present disclosure do not have any limitations on specific timing of disabling interrupts. In implementations, prior to writing a tracking result of an activity of an operating system into a buffer when interrupts are disabled, the interrupts may be disabled in response to detecting that an API of the operating system is called and corresponding calling information meets a preset condition. After the interrupts are disabled, a processor is not able to respond to asynchronous interrupts generated by hardware, thereby protecting the security of data corresponding to a critical section of code, and avoiding a loss of data corresponding to the critical section of code caused by the asynchronous interrupts to some extent.

In implementations, the preset condition may include: a calling party and a called party involved in the calling information being different. For example, if the calling information is that an A task deletes the A task, the calling information in this case does not meet the preset condition as the calling party and the called party involved in the calling information are the same. In implementations, the preset condition may include: a calling party involved in the calling information being not idle. For example, if the calling information is that an A task deletes a B task, B task, and if the B task is an idle task, the call information in this case does not meet the preset condition. It can be understood that a specific time for disabling interrupts can be determined by one skilled in the art according to actual application requirements. The embodiments of the present disclosure do not have any limitations on specific preset conditions and specific timings of interrupts.

S202 can write a tracking result of activit(ies) of an operating system and/or running activit(ies) of a program into a buffer when interrupts are disabled. In practical applications, a processor can be used to write a tracking result of activit(ies) of an operating system and/or running activit(ies) of a program into a buffer. The rate at which the processor writes the tracking result of the activit(ies) of the operating system and/or the running activit(ies) of the program into the buffer is usually substantially higher than the rate of transmitting the tracking result of the activit(ies) of the operating system and/or the running activit(ies) of the program by means of a serial communication, etc. Therefore, the embodiments of the present disclosure can quickly write a tracking result of activit(ies) of an operating system and/or running activit(ies) of a program into a buffer when interrupts are disabled, which can effectively shorten the maximum time during which interrupts are disabled for the operating system, and can thereby improve a response time of the operating system and/or the program.

In implementations, a data structure, such as a queue, an array, or a linked list, may be established in a memory area of a device, and acts as the buffer that is described above. The embodiments of the present disclosure do not have any limitations on specific buffers.

In implementations, a specific format corresponding to the tracking result that is written into the buffer may be a format of a tracking instruction, for example, a plurality of pieces of activity information of the operating system may be combined to obtain a tracking instruction. Furthermore, the tracking instruction can be written into the buffer. It can be understood that the embodiments of the present disclosure do not have any limitations on a specific format corresponding to a tracking result that is written into a buffer.

In implementations, after the tracking result of the activity of the operating system and/or the running activity of the program is written into the buffer, interrupts are enabled, so that S204 reads and sends the tracking result from the buffer when the interrupts are enabled. In implementations, writing the tracking result of the activity of the operating system and/or the running activity of the program into the buffer may include: writing a tracking result of all activities of the operating system corresponding to an API of the operating system behaviors into the buffer, and/or writing a tracking result of all program running activities corresponding to an API of the program into the buffer. In this case, this means that an execution of the API of the operating system and/or the API of the program is completed, and the operating system can leave from the critical section of the code. As such, interrupts can be enabled. It can be understood that the embodiments of the present disclosure do not have any limitations on specific timing for enabling interrupts.

S204 can read the tracking result from the buffer and send the tracking result when interrupts are enabled. In practical applications, the tracking result can be read according to characteristics of the buffer. In an application example of the present disclosure, the buffer may be a queue, and tracking results may be written and read according to a first-in-first-out characteristic of the queue.

In practical applications, a serial communication, a network communication, etc. can be used to transmit the tracking result that is read. Specifically, the read tracking result may be sent to a peer device. In implementations, the peer device may be a debugging device. A debugger may be run on the debugging device. The debugger may be an integrated development environment running on the debugging device. The debugger can have editing, assembling, compiling, linking and debugging be integrated into one body, and support low-level assembly language, C language, etc. being able to provide debugging services to users based on friendly graphical user interfaces.

In practical applications, a first task may be established in the background of the operating system. The first task can be used to perform operations of reading the tracking result from the buffer and transmitting the tracking result when interrupts are enabled at S204. In implementations, a priority level of the first task may be a preset priority level to avoid the impact of the first task on other tasks such as foreground tasks. The preset priority level is determined by one skilled in the art according to actual application requirements. For example, the preset priority level may be a priority level lower than priority levels of foreground tasks. The embodiments of the present disclosure do not have any limitations on specific preset priority levels.

In implementations, a process of reading and sending the tracking result from the buffer when the interrupts are enabled at S204 may include: reading and sending the tracking result from the buffer when the interrupts are enabled according to a preset period. The preset period may be determined by one skilled in the art according to actual application requirements. For example, a length of the preset period may be a value of 10 milliseconds, etc.

in implementations, reading and sending the tracking result from the buffer when the interrupts are enabled according to the preset period may specifically include: reading and sending the tracking result from the buffer when the interrupts are enabled; and entering into a sleep state according to the preset period after the read tracking result is sent. A time duration of the sleep state may be the length of the preset period, so that after the sleep is ended, an operation of reading tracking result(s) from the buffer and transmitting the tracking result(s) may be continued when interrupts are enabled.

It can be understood that the above manner of reading the tracking result from the buffer and transmitting the tracking result according to the preset period is only an exemplary embodiment about timing for reading the tracking result from the buffer. In practice, one skilled in the art can use other times for reading the tracking result from the buffer according to actual application requirements. For example, after an execution of the API of the operating system and/or the API of the program is completed, the tracking result is read from the buffer when interrupts are enabled, etc. The embodiments of the present disclosure do not have any limitations on specific timing for reading the tracking result from the buffer.

In summary, the tracking method in the embodiments of the present disclosure can write a tracking result of activit (ies) of an operating system and/or running activit(ies) of a program into a buffer using a processor when interrupts are disabled. The rate at which the processor writes the tracking result of the activit(ies) of the operating system and/or the running activit(ies) of the program into the buffer is generally significantly higher than the rate at which the tracking result of the activit(ies) of the operating system and/or the running activit(ies) of the program is transmitted through a serial communication or the like. Therefore, the embodiments of the present disclosure can quickly write the tracking result of the activit(ies) of the operating system and/or the running activit(ies) of the program into the buffer. As such, the maximum time during which interrupts are disabled for the operating system can be effectively shortened, and the performance of the operating system and/or the program can thereby be effectively improved. For example, the embodiments of the present disclosure can avoid an occurrence of an error of an operating system that is caused by an activity of the system under the influence of an increase in the maximum time during which interrupts are disabled to some extent.

Figure 3:
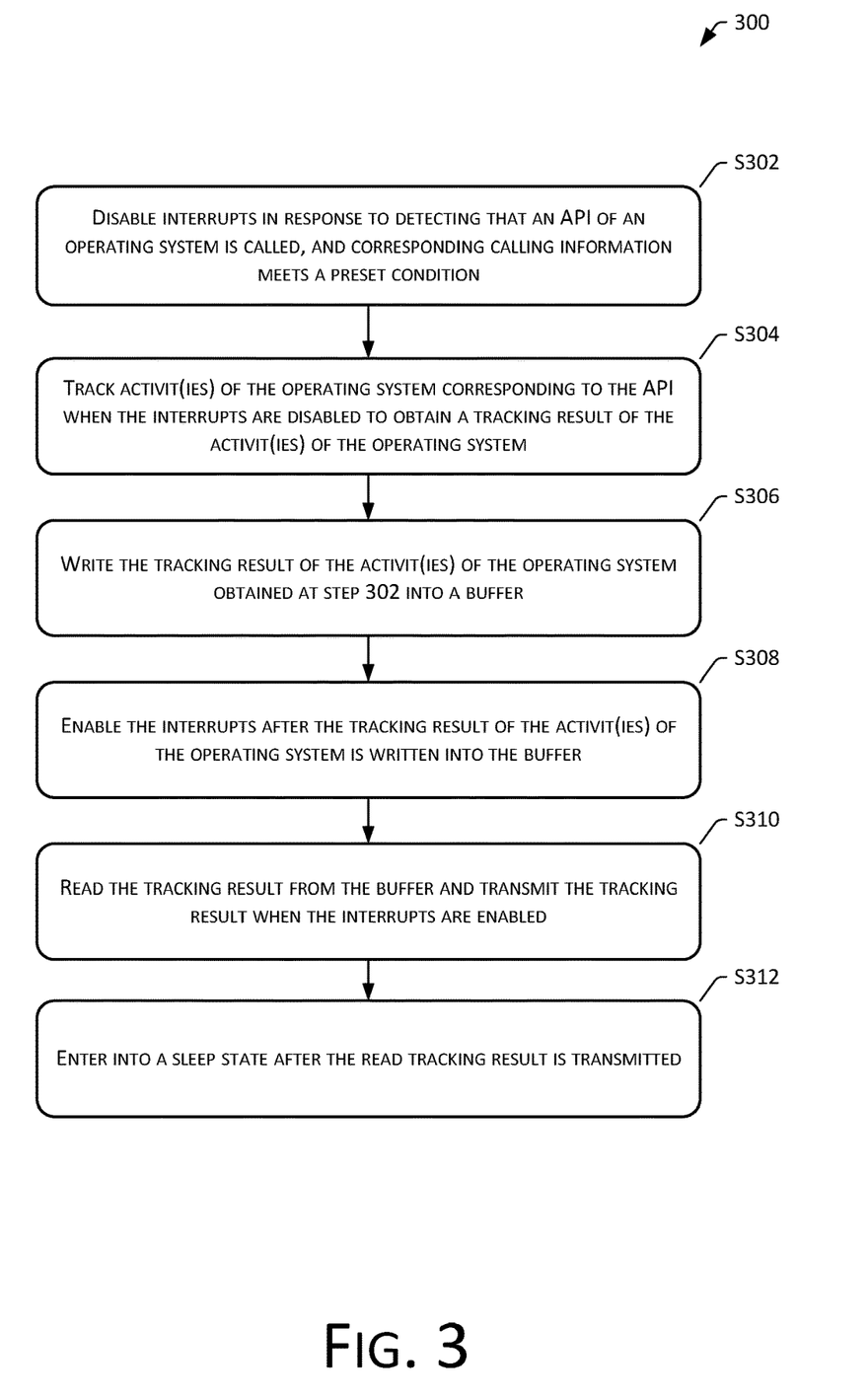
FIG. 3 is a flowchart of another exemplary tracking method of the present disclosure.

Referring to FIG. 3, a flowchart of an exemplary tracking method 300 of the present disclosure is shown, which may specifically include the following operations.

S302: Disable interrupts in response to detecting that an API of an operating system is called, and corresponding calling information meets a preset condition.

S304: Track activit(ies) of the operating system corresponding to the API when the interrupts are disabled to obtain a tracking result of the activit(ies) of the operating system.

S306: Write the tracking result of the activit(ies) of the operating system obtained at S304 into a buffer.

S308: Enable the interrupts after the tracking result of the activit(ies) of the operating system is written into the buffer.

S310: Read the tracking result from the buffer and transmit the tracking result when the interrupts are enabled.

S312: Enter into a sleep state after the read tracking result is transmitted.

In practical applications, the tracking method of the embodiments of the present disclosure may be used in a tracking function of the operating system, and the tracking function may be a sub-function of the API of the operating system. In this case, during an execution process of the API of the operating system, tracking of activit(ies) of the operating system corresponding to the called API is implemented through S304, and writing of the tracking result that is obtained at S304 into the buffer is implemented through S306.

After the tracking result of the activit(ies) of the operating system that is obtained at S304 is written into the buffer, this indicates that an execution of the API of the operating system is completed, and the operating system can leave from a critical code section. Therefore, interrupts can be enabled at S308. It can be understood that the embodiments of the present disclosure do not have any limitations on specific timing for enabling interrupts.

S310 can read the tracking result from the buffer and send the tracking result when the interrupts are enabled, so as to avoid the influence of the rate of sending the tracking result of the activities of the operating system through a serial communication or the like on the maximum time during which interrupts are disabled for the operating system.

Figure 4:
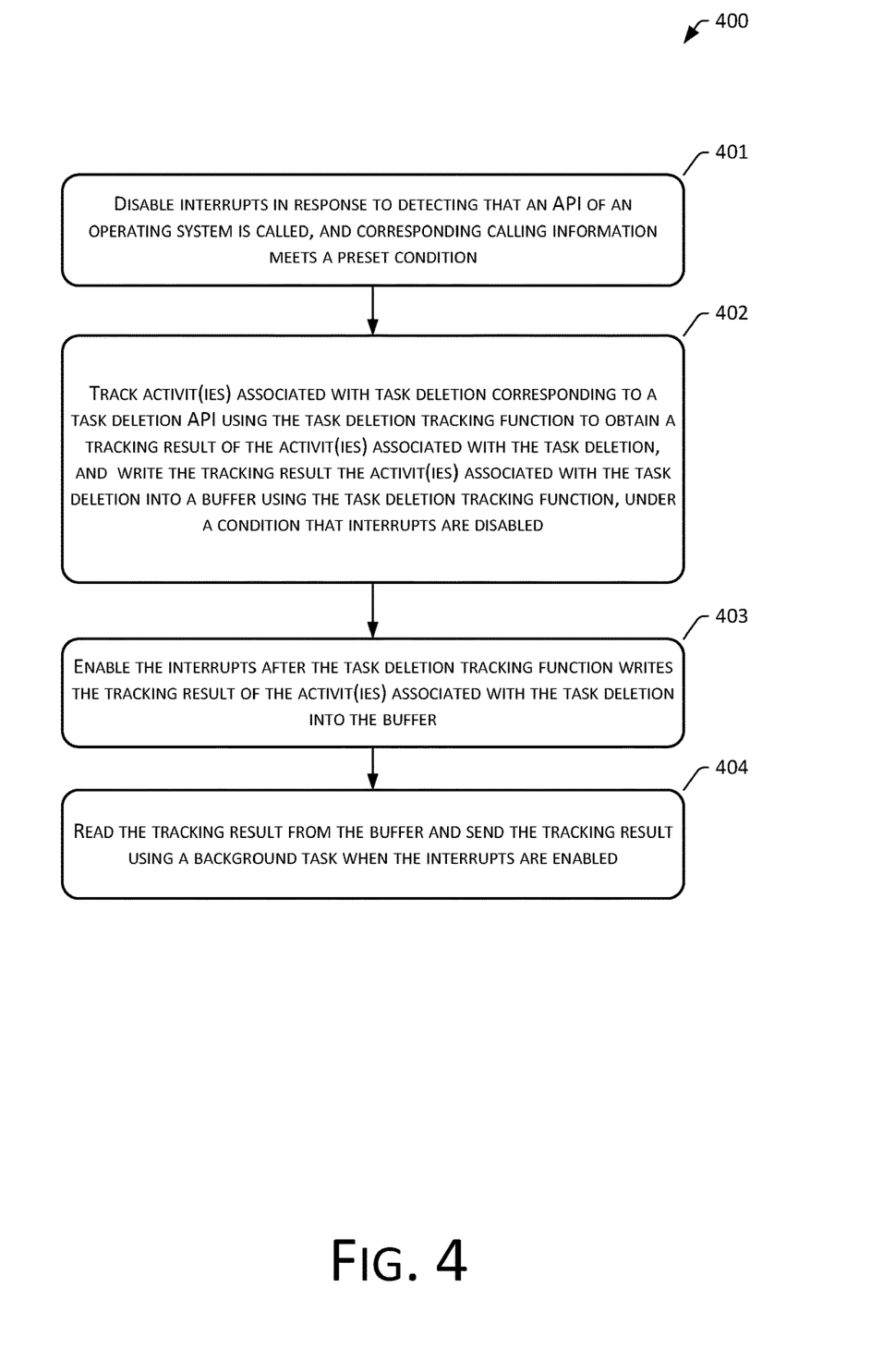
FIG. 4 is a flowchart of still another exemplary tracking method of the present disclosure.

In order to enable one skilled in the art to better understand the embodiments of the present disclosure, the tracking methods of the embodiments of the present disclosure are described using a specific example. This example relates to tracking an activity associated with a task deletion of an operating system, and this activity of task deletion is assumed to be executed by a task deletion API. In this case, a task deletion tracking function may be set in the task deletion API. The task deletion tracking function is used for tracking the activity of task deletion. Referring to FIG. 4, a flowchart of an embodiment of a tracking method 400 of the present disclosure is shown, which may specifically include the following operations.

S402: Disable interrupts in response to detecting that an API of an operating system is called, and corresponding calling information meets a preset condition.

In implementations, the operation corresponding to operation 401 may exist in the API of the operating system. Specifically, in a process of executing an API of an operating system, a determination may first be made as to whether corresponding calling information meets a preset condition, and interrupts are disabled if affirmative.

S404: Track activit(ies) associated with task deletion corresponding to a task deletion API using the task deletion tracking function to obtain a tracking result of the activit(ies) associated with the task deletion, and write the tracking result the activit(ies) associated with the task deletion into a buffer using the task deletion tracking function, under a condition that interrupts are disabled.

S406: Enable the interrupts after the task deletion tracking function writes the tracking result of the activit(ies) associated with the task deletion into the buffer.

S408: Read the tracking result from the buffer and send the tracking result using a background task when the interrupts are enabled.

In implementations, the task deletion tracking function does not directly send the tracking result of the activit(ies) associated with the task deletion through an interface, but sends the tracking result of the activit(ies) associated with the task deletion to the buffer. The speed of sending the tracking result of the activit(ies) associated with the task deletion to the buffer is very fast, so that interrupts will not be disabled for a long time, thereby avoiding the interrupts from affecting the real-time performance of the operating system to some extent.

In implementations, the background task may be used for reading and sending the tracking result from the buffer. In practical applications, a priority level of the background task may be a preset priority level, to avoid the background task from having any impact on other tasks, such as foreground tasks, etc. As an example, a background task can read all tracking results from the buffer in every 10 milliseconds, and send them out through the interface.

It should be noted that the method embodiments are all expressed as a series of action combinations for the sake of simple description. One skilled in the art should understand that the embodiments of the present disclosure are not limited by the described orders of actions, because certain blocks may be performed in other orders or in parallel in accordance with the embodiments of the present disclosure. Furthermore, one skilled in the art should also understand that the embodiments described in the specification are all exemplary embodiments, and actions involved may not be necessarily required in the embodiments of the present disclosure.

The present disclosure also provides a tracking apparatus.

Figure 5:
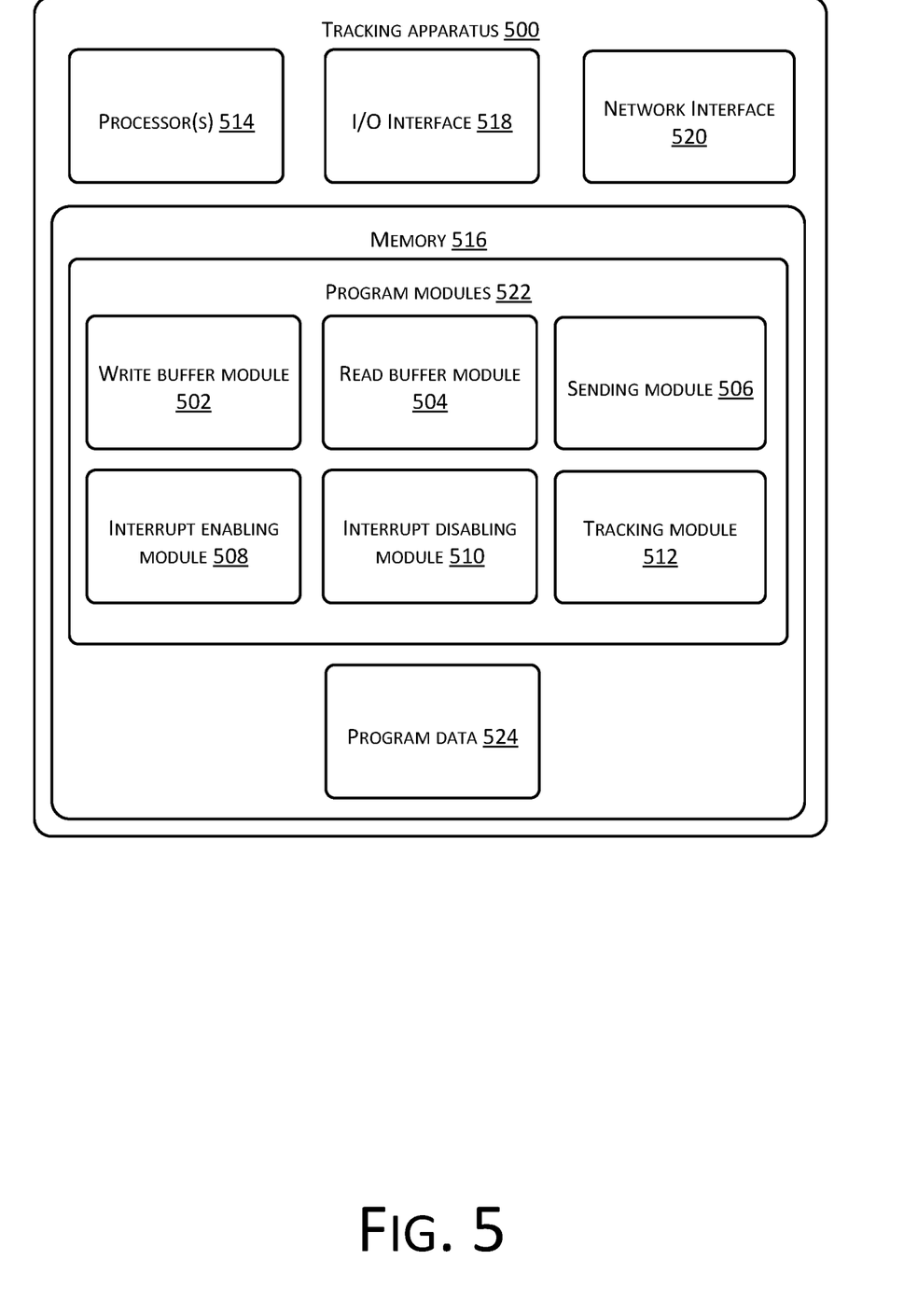
FIG. 5 is a block diagram showing a structure of an exemplary tracking apparatus of the present disclosure.

Referring to FIG. 5, a structural block diagram of an embodiment of a tracking apparatus 500 of the present disclosure is shown. The apparatus 500 may specifically include the following modules.

A write buffer module 502 is configured to write a tracking result of an activity of an operating system and/or a running activity of a program into a buffer when an interrupt is disabled.

A read buffer module 504 is configured to read the tracking result from the buffer when the interrupt is enabled.

A sending module 506 is configured to send the read tracking result when the interrupt is enabled.

In implementations, the read buffer module 504 can read the tracking result from the buffer according to a preset period when the interrupt is enabled.

The sending module 506 can send the read tracking result according to the preset period when the interrupt is enabled.

In implementations, the read buffer module 504 and the sending module 506 may enter a sleep state according to the preset period after the sending module 506 sends the read tracking result.

In implementations, the apparatus 500 may further include an interrupt enabling module 508 configured to enable the interrupt after the tracking result of the activity of the operating system and/or the running activity of program is written into the buffer, before the read buffer module 504 reads the tracking result from the buffer when the interrupt is enabled.

In implementations, the apparatus 500 further includes an interrupt disabling module 510 configured to disable the interrupt in response to detecting that an API of the operating system is called and corresponding call information satisfies a preset condition, before the write buffer module 502 writes the tracking result of the activity of the operating system and/or the running activity of the program into the buffer when the interrupted is disabled.

In implementations, the apparatus 500 further includes a tracking module 512 configured to: in response to detecting that an API of the operating system and/or the program is called, track a corresponding activity of the operating system behavior and/or a corresponding running activity of the program of the called API to obtain the tracking result of the activity of the operating system and/or the running activity of the program, before the write buffer module 502 writes the tracking result of the activity of the operating system and/or the running activity of the program into the buffer when the interrupted is disabled.

In implementations, the apparatus 500 may further include one or more processors 514, a memory 516, an input/output (I/O) interface 518, and a network interface 520.

The memory 516 may include a form of machine-readable media such as a volatile memory, a random access memory (RAM) and/or a non-volatile memory, for example, a read-only memory (ROM) or a flash RAM. The memory 516 is an example of a processor readable media.

The machine-readable media may include a volatile or non-volatile type, a removable or non-removable media, which may achieve storage of information using any method or technology. The information may include a machine-readable instruction, a data structure, a program module or other data. Examples of machine-readable media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the machine-readable media does not include transitory media, such as modulated data signals and carrier waves.

In implementations, the memory 516 may include program modules 522 and program data 524. The program modules 522 may include one or more modules as described in the foregoing description and shown in FIG. 5.

Due to its basic similarities to the method embodiments as shown in FIGS. 1-3, the description of the apparatus embodiment as shown in FIG. 5 is relatively simple. Relevant parts can be referenced to the description of the method embodiments as shown in FIGS. 1-3.

In short, the tracking apparatus of the embodiments of the present disclosure can write tracking results of activities of an operating system and/or running activities of programs into a buffer using a processor when interrupts are disabled. The speed at which the processor writes the tracking results of the activities of the operating system and/or the running activities of the programs into the buffer is generally significantly higher than the speed at which the tracking results of the activities of the operating system and/or the running activities of the programs are transmitted through a serial communication or the like. Therefore, the embodiments of the present disclosure can quickly write tracking results of activities of an operating system and/or running activities of programs into a buffer when interrupts are disabled, so that the maximum time during which interrupts are disabled for the operating system can be effectively shortened, and the performance of the operating system and/or the program can thereby be effectively improved. For example, the embodiments of the present disclosure can avoid an occurrence of an error of an operating system that is caused by an activity of the system under the influence of an increase in the maximum time during which interrupts are disabled to some extent.

Figure 6:
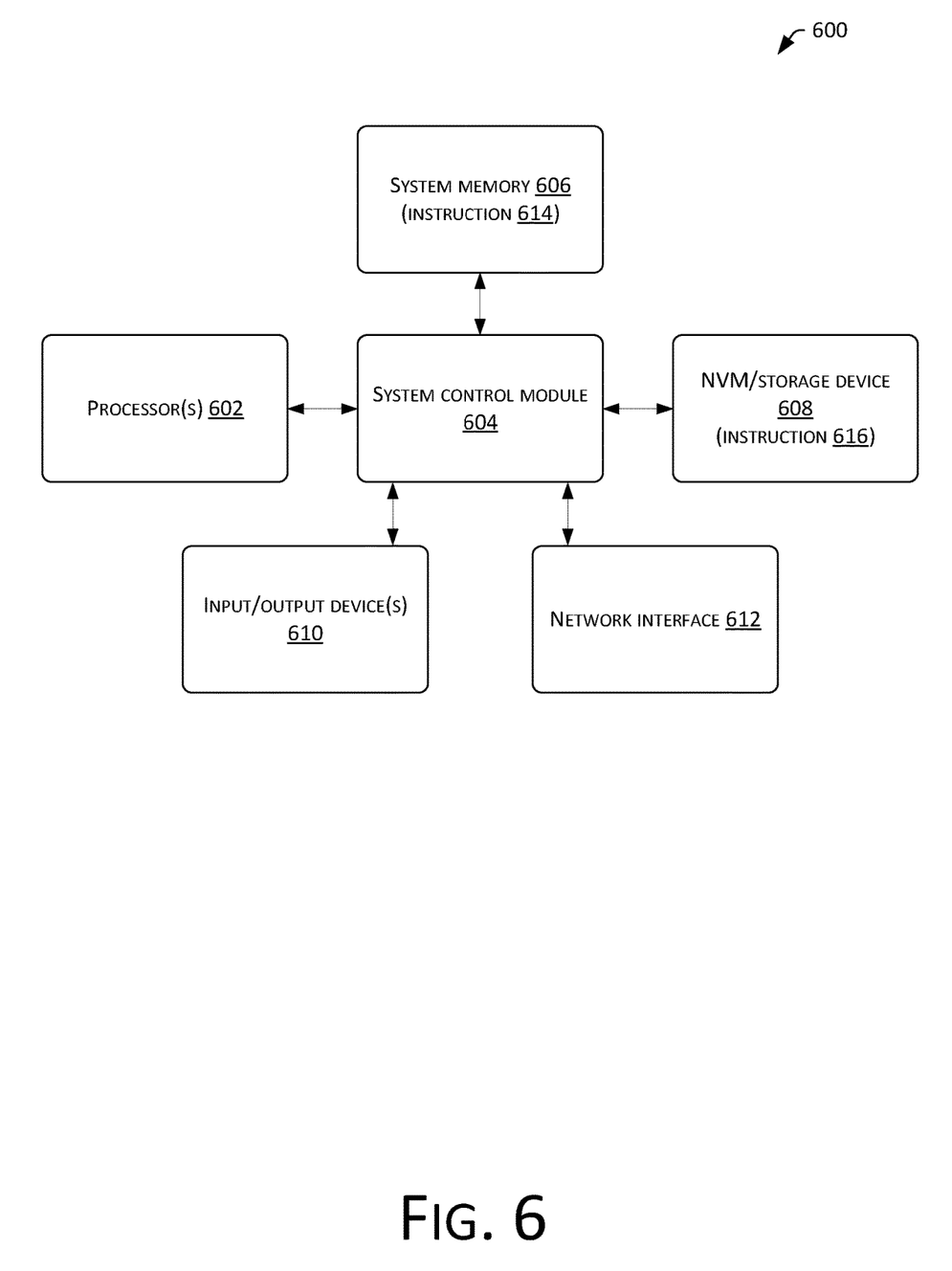
FIG. 6 is a schematic structural diagram of a device according to an embodiment of the present disclosure.

An embodiment of the present disclosure can be implemented as a system or device having a desired configuration using any suitable hardware and/or software. FIG. 6 schematically illustrates an exemplary device 600 that can be used to implement various embodiments described in the present disclosure.

In implementations, FIG. 6 illustrates an exemplary device 600 that can include one or more processors 602, a system control module (chipset) 604 coupled to at least one of the processors 602, and a system memory 606 coupled to the control module 604, a non-volatile memory (NVM)/storage device 608 coupled to the system control module 604, one or more input/output devices 610 coupled to the system control module 604, and a network interface 612 coupled to the system control module 604. The system memory 606 can include instructions 614 that are executable by the one or more processors 602.

The processors 602 can include one or more single-core or multiple-core processors. The processors 602 can include any combination of general-purpose or special-purpose processors (e.g., graphics processors, application processors, baseband processors, etc.). In implementations, the device 600 can serve as a server, a target device, a wireless device, etc., as described in the embodiments of the present disclosure.

In implementations, the device 600 can include one or more machine-readable media (e.g., the system memory 606 or the NVM/storage device 608) having instructions and the one or more processors 602 that cooperate with the one or more machine-readable media and are configured to execute instructions to implement the modules included in the aforementioned apparatus, and thereby perform the actions described in the embodiments of the present disclosure.

The system control module 604 can include any suitable interface controller used for providing any suitable interface to at least one of the processors 602 and/or any suitable device or component in communication with the system control module 604.

The system control module 604 can include one or more memory controllers used for providing an interface to the system memory 606. The memory controller can be a hardware module, a software module, and/or a firmware module.

The system memory 606 can be configured to load and store data and/or instructions 614. In implementations, the system memory 606 can include any suitable volatile memory, such as a suitable DRAM (dynamic random access memory). In implementations, the system memory 606 can include a double data rate type four synchronous dynamic random access memory (DDR4 SDRAM).

The system control module 604 may include one or more input/output controllers to provide an interface to the NVM/storage device 608 and the input/output device(s) 610.

The NVM/storage device 608 can be configured to store data and/or instructions 616. NVM/storage device 608 can include any suitable non-volatile memory (e.g., a flash memory, etc.) and/or can include any suitable non-volatile storage device(s), such as one or more hard disk drives (HDD), one or more compact disc (CD) drives and/or one or more digital versatile disc (DVD) drives, etc.

The NVM/storage device 608 can include a storage resource that is physically a part of a device on which the device 600 is installed, or can be accessed by the device without having to be a part of the device. For example, the NVM/storage device 608 can be accessed via the network interface 612 through a network and/or through the input/output device 610.

The input/output device(s) 610 of an embodiment can provide an interface for the device 600 to communicate with any other suitable devices, and the input/output device 610 can include a communication component, an audio component, a sensor component, etc.

The network interface 612 of an embodiment may provide an interface for the device 600 to conduct wireless communications with one or more components of a wireless network based on any standard and/or protocol of one or more wireless network standards and/or protocols, such as accessing a wireless network based on a communication standard, such as WiFi, 2G or 3G, or a combination thereof for conducting wireless communications.

In implementations, at least one of the processors 602 can be packaged with the logic of one or more controllers (e.g., memory controllers) of the system control module 604. In implementations, at least one of the processors 602 can be packaged with the logic of one or more controllers of the system control module 604 to form a system in package (SiP). In implementations, at least one of the processors 602 can be integrated with the logic of one or more controllers of the system control module 604 on a same new product. In implementations, at least one of the processors 602 can be integrated with the logic of one or more controllers of the system control module 604 on a same chip to form a system on chip (SoC).

In implementations, the device 600 may include, but is not limited to, a computing device, such as a desktop computing device or a mobile computing device (e.g., a laptop computing device, a handheld computing device, a tablet computer, a netbook, etc.). In various embodiments, the device 600 may have more or fewer components and/or different architectures. For example, in implementations, the device 600 may include one or more cameras, a keyboard, a liquid crystal display (LCD) screen (including a touch screen display), a non-volatile memory port, multiple antennas, a graphics chip, an application specific integrated circuit (ASIC), and a speaker.

If the display includes a touch panel, a screen of the display can be implemented as a touch screen display to receive input signals from a user. The touch panel includes one or more touch sensors to sense touches, slides, and gestures on the touch panel. The touch sensor may sense not only the boundary of a touching or sliding action, but also the duration and pressure associated with the touching or sliding operation.

The embodiments of the present disclosure further provide a non-volatile readable storage medium. The storage medium stores one or more modules (programs). The one or more programs, when being applied to a computing device, can cause the device to perform instructions of various methods in the embodiments of the present disclosure.

In an example, a device is provided, and includes: one or more processors; and one or more machine readable mediums storing instructions that, when executed by the one or more processors, cause the device to perform the method(s) in the embodiments of the present disclosure.

In an example, one or more machine-readable media are provided, and have instructions that, when executed by one or more processors, cause a device to perform the method(s) in the embodiments of the present disclosure.

A tracking method, a tracking device, a device, and one or more machine readable media provided by the present disclosure are described in detail above. The principles and implementations of the present disclosure are described using specific examples in the present specification. The description of the above embodiments is merely used for helping to understand the methods and core ideas of the present disclosure. Furthermore, for one of ordinary skill in the art, changes exist in specific embodiments and applications according to the ideas of the present disclosure. In short, the content of the present specification should not be construed as limitations to the present disclosure.

The present disclosure can further be understood using the following clauses.

Clause 1: A tracking method comprising: writing a tracking result of an activity of an operating system and/or a running activity of a program into a buffer when an interrupt is disabled; and reading and sending the tracking result from the buffer when the interrupt is enabled.

Clause 2: The method of Clause 1, wherein reading and sending the tracking result from the buffer when the interrupt is enabled comprises reading and sending the tracking result from the buffer according to a preset period when the interrupt is enabled.

Clause 3: The method of Clause 2, wherein reading and sending the tracking result from the buffer according to the preset period when the interrupt is enabled comprises: reading and sending the tracking result from the buffer when the interrupt is enabled; and entering a sleep state according to the preset period after sending the read tracking result.

Clause 4: The method of any one of Clauses 1-3, wherein: prior to reading and sending the tracking result from the buffer when the interrupt is enabled, the method further comprises enabling the interrupt after the tracking result of the operating system activity and/or the program running activity is written into the buffer.

Clause 5: The method of any one of Clauses 1-3, wherein: prior to writing the tracking result of the activity of the operating system and/or the running activity of the program into the buffer when the interrupt is disabled, the method further comprises disabling the interrupt in response to detecting that an API of the operating system and/or the program is called, and corresponding calling information satisfies a preset condition.

Clause 6: The method of any one of Clauses 1-3, wherein: prior to writing the tracking result of the activity of the operating system and/or the running activity of the program into the buffer when the interrupt is disabled, the method further comprises: in response to detecting that an API of the operating system and/or the program is called, tracking a corresponding activity of the operating system and/or a corresponding running activity of the program of the called API to obtain the tracking result of the activity of the operating system and/or the running activity of the program.

Clause 7: A tracking apparatus comprising: a write buffer module configured to write a tracking result of an activity of an operating system and/or a running activity of a program into a buffer when an interrupt is disabled; a read buffer module configured to read the tracking result from the buffer when the interrupt is enabled; and a sending module configured to send the read tracking result when the interrupt is enabled.

Clause 8: The apparatus of Clause 7, wherein: the read buffer module reads the tracking result from the buffer according to a preset period when the interrupt is enabled; and the sending module sends the read tracking result according to the preset period when the interrupt is enabled.

Clause 9: The apparatus of Clause 8, wherein the read buffer module and the sending module enter a sleep state according to a preset period after the sending module sends the read tracking result.

Clause 10: The apparatus of any one of Clauses 7-9, further comprising an interrupt enabling module configured to enable the interrupt after the tracking result of the activity of the operating system and/or the running activity of program is written into the buffer, before the read buffer module reads the tracking result from the buffer when the interrupt is enabled.

Clause 11: The apparatus of any one of Clauses 7-9, further comprising an interrupt disabling module configured to disable the interrupt in response to detecting that an API of the operating system is called and corresponding call information satisfies a preset condition, before the write buffer module writes the tracking result of the activity of the operating system and/or the running activity of the program into the buffer when the interrupted is disabled.

Clause 12: The apparatus of any one of Clauses 7-9, further comprising a tracking module configured to: in response to detecting that an API of the operating system and/or the program is called, track a corresponding activity of the operating system behavior and/or a corresponding running activity of the program of the called API to obtain the tracking result of the activity of the operating system and/or the running activity of the program, before the write buffer module writes the tracking result of the activity of the operating system and/or the running activity of the program into the buffer when the interrupted is disabled.

Clause 13: A tracking device comprising: one or more processors, and one or more machine-readable media storing instructions that, when executed by the one or more processors, cause the device to perform one or more of the methods of Clauses 1-6.

Clause 14: One or more machine-readable media storing instructions that, when executed by one or more processors, cause a device to perform one or more of the methods of Clauses 1-6.

What is claimed is:

1. A method implemented by one or more processors of a computing device, the method comprising:
    tracking an activity of an operating system or a running activity of a program;
    writing a tracking result of the activity of the operating system or the running activity of the program into a buffer in response to determining that an interrupt is disabled;
    enabling the interrupt after the tracking result is written into the buffer;
    reading the tracking result from the buffer and sending the tracking result to a device via a communication interface according to a preset period in response to determining that the interrupt is enabled; and
    entering a sleep state according to the preset period after sending the tracking result.

2. The method of claim 1, wherein: prior to writing the tracking result of the activity of the operating system or the running activity of the program into the buffer in response to determining that the interrupt is disabled, the method further comprises disabling the interrupt in response to detecting that an API of the operating system or the program is called, and corresponding calling information satisfies a preset condition.

3. The method of claim 1, further comprising detecting that an API of the operating system or the program is called, prior to writing the tracking result of the activity of the operating system or the running activity of the program into the buffer in response to determining that the interrupt is disabled.

4. The method of claim 3, further comprising tracking a corresponding activity of the operating system or a corresponding running activity of the program of the API to obtain the tracking result of the activity of the operating system or the running activity of the program, in response to detecting that the API of the operating system or the program is called.

5. An apparatus comprising:
    one or more processors;
    memory;
    a write buffer module stored in the memory and executable by the one or more processors to track an activity of an operating system or a running activity of a program and write a tracking result of the activity of the operating system or the running activity of the program into a buffer in response to determining that an interrupt is disabled;
    an interrupt enabling module configured to enable the interrupt after the tracking result is written into the buffer;
    a read buffer module stored in the memory and executable by the one or more processors to read the tracking result from the buffer in response to determining that the interrupt is enabled; and
    a sending module stored in the memory and executable by the one or more processors to send the read tracking result to a device via a communication interface according to a preset period in response to determining that the interrupt is enabled, and enter a sleep state according to a preset period after the sending module sends the tracking result.

6. The apparatus of claim 5, further comprising an interrupt disabling module configured to disable the interrupt in response to detecting that an API of the operating system is called and corresponding calling information satisfies a preset condition, before the write buffer module writes the tracking result of the activity of the operating system or the running activity of the program into the buffer in response to determining that the interrupt is disabled.

7. The apparatus of claim 5, further comprising a tracking module configured to detect that an API of the operating system or the program is called, before the write buffer module writes the tracking result of the activity of the operating system or the running activity of the program into the buffer in response to determining that the interrupt is disabled.

8. The apparatus of claim 7, wherein the tracking module is further configured to track a corresponding activity of the operating system or a corresponding running activity of the program of the API to obtain the tracking result of the activity of the operating system or the running activity of the program.

9. One or more machine-readable media storing instructions that, when executed by one or more processors, cause the one or more processors to perform acts comprising:
  tracking an activity of an operating system or a running activity of a program;
  writing a tracking result of the activity of the operating system or the running activity of the program into a buffer in response to determining that an interrupt is disabled;
  enabling the interrupt after the tracking result is written into the buffer;
  reading the tracking result from the buffer and sending the tracking result to a device via a communication interface according to a preset period in response to determining that the interrupt is enabled; and
  entering a sleep state according to the preset period after sending the tracking result.

10. The one or more machine-readable media of claim 9, wherein:
  prior to writing the tracking result of the activity of the operating system or the running activity of the program into the buffer in response to determining that the interrupt is disabled, the acts further comprise disabling the interrupt in response to detecting that an API of the operating system or the program is called, and corresponding calling information satisfies a preset condition.

11. The one or more machine-readable media of claim 9, the acts further comprising:
  detecting that an API of the operating system or the program is called, prior to writing the tracking result of the activity of the operating system or the running activity of the program into the buffer in response to determining that the interrupt is disabled; and
  tracking a corresponding activity of the operating system or a corresponding running activity of the program of the API to obtain the tracking result of the activity of the operating system or the running activity of the program, in response to detecting that the API of the operating system or the program is called.

12. The method of claim 1, wherein the activity of the operating system includes at least one of:
  a task deletion,
  a task creation,
  a change of task priority,
  a creation of a semaphore, or
  a creation of a mutex lock.

13. The method of claim 1, wherein the preset period is 10 milliseconds.

14. The method of claim 2, wherein the preset condition includes at least one of:
  a calling party and a called party involved in the calling information being different, or
  a calling party involved in the calling information being not idle.

15. The apparatus of claim 5, wherein the activity of the operating system includes at least one of:
  a task deletion,
  a task creation,
  a change of task priority,
  a creation of a semaphore, or
  a creation of a mutex lock.

16. The apparatus of claim 5, wherein the preset period is 10 milliseconds.

17. The apparatus of claim 6, wherein the preset condition includes at least one of:
  a calling party and a called party involved in the calling information being different, or
  a calling party involved in the calling information being not idle.

18. The one or more machine-readable media of claim 9, wherein the activity of the operating system includes at least one of:
  a task deletion,
  a task creation,
  a change of task priority,
  a creation of a semaphore, or
  a creation of a mutex lock.

19. The one or more machine-readable media of claim 9, wherein the preset period is 10 milliseconds.

20. The one or more machine-readable media of claim 10, wherein the preset condition includes at least one of:
  a calling party and a called party involved in the calling information being different, or
  a calling party involved in the calling information being not idle.

* * * * *